United States Patent
Benedetti et al.

[11] Patent Number: 6,157,665
[45] Date of Patent: Dec. 5, 2000

[54] METHOD TO LOAD SCRAP FOR ELECTRIC ARC FURNACE AND RELATIVE SYSTEM

[75] Inventors: Giampietro Benedetti, Campoformido; Milorad Pavlicevic, Udine; Alfredo Poloni, Fogliano di Redipuglia; Gianni Gensini, Buia; Angelico Della Negra, Povoletto, all of Italy

[73] Assignee: Danieli & C. Officine Meccaniche SpA, Buttrio, Italy

[21] Appl. No.: 09/381,913

[22] PCT Filed: Mar. 23, 1998

[86] PCT No.: PCT/IB98/00429

§ 371 Date: Sep. 27, 1999

§ 102(e) Date: Sep. 27, 1999

[87] PCT Pub. No.: WO98/43032

PCT Pub. Date: Oct. 1, 1998

[30] Foreign Application Priority Data

Mar. 26, 1997 [IT] Italy ..................... G97A0009

[51] Int. Cl.[7] ..................................... F27D 3/00
[52] U.S. Cl. ................... 373/79; 373/78; 373/80
[58] Field of Search .................. 373/78–80, 9, 373/8; 266/142–147

[56] References Cited

U.S. PATENT DOCUMENTS

| | | | |
|---|---|---|---|
| 3,385,584 | 5/1968 | Kemmetmueller | 373/78 |
| 4,160,117 | 7/1979 | Schempp | 373/80 |
| 4,390,168 | 6/1983 | Muller | 266/142 |
| 4,506,370 | 3/1985 | Yoshimatsu | 373/8 |
| 4,736,383 | 4/1988 | Meierling | 373/78 |
| 5,390,212 | 2/1995 | Bonnet et al. | 373/79 |
| 5,416,792 | 5/1995 | Vice | 373/80 |
| 5,602,867 | 2/1997 | Hubers et al. | 373/78 |
| 5,628,958 | 5/1997 | Frank | 266/143 |

FOREIGN PATENT DOCUMENTS

| | | |
|---|---|---|
| 225939 | 3/1985 | European Pat. Off. . |
| 2017290 | 9/1981 | United Kingdom . |
| 9210594 | 6/1992 | WIPO . |
| 9632616 | 10/1996 | WIPO . |

*Primary Examiner*—Tu Ba Hoang
*Attorney, Agent, or Firm*—Antonelli, Terry, Stout & Kraus, LLP

[57] ABSTRACT

Method to load scrap for electric arc furnace including at least a roof (13) associated with movable moving means (17) cooperating with second movable moving means (24), the roof (13) including at least a hole (15) to discharge the fumes (16), the scrap (22) being contained in baskets (21), there being included at least a system to process the fumes (32) connected with the chimney, the full basket (21) including at least a first position (21a) to pre-heat the scrap arranged at the side of and in proximity to the furnace (10) and a second position (21b) to unload the scrap arranged in cooperation with the mouth of the furnace (10), the movable moving means (24) of the basket (21) and the movable moving means (17) of the roof (13) being functionally associated at least momentarily, the basket (21) containing the scrap being installed in a removable manner on the second movable moving means (24) and being associated at least temporally with a covering system (29), which can be translated from a closed position to an open position, the fumes (16) leaving the fourth hole (15) of the furnace (10) being sent inside the basket (21) containing the scrap (22) through a discharge duct which connects an inlet aperture (27) included on the covering system (29) with the fourth hole of the furnace (13), the fumes (16) being made to leave the basket (21) through an outlet aperture cooperating with the bottom of the furnace (13), the fumes (16) being made to leave the basket (21) through an outlet aperture cooperating with the bottom of the basket (21) and directly connected with a combustion chamber (28), the roof (13) passing from its first closed position (13a) to its second open position (13b) in coordination with the passage of the basket (21) from its first pre-heating position (21a) to its second unloading position (21b).

13 Claims, 6 Drawing Sheets fig.1a fig.1b fig.1c fig.2 fig.6 fig.3 fig. 4 fig. 5 fig.7 fig.8 fig.9 fig.10

METHOD TO LOAD SCRAP FOR ELECTRIC ARC FURNACE AND RELATIVE SYSTEM

FIELD OF APPLICATION

This invention concerns a system to load scrap by means of baskets for an electric arc furnace, and also the relative system.

The invention is applied in the field of steel production in order to load, by means of baskets, the electric furnaces with scrap which is pre-heated by means of the fumes coming from the said electric furnaces.

The electric arc furnaces to which the invention is applied can be of the type fed by alternating or direct current.

The invention makes it possible to reduce the times needed to open the roof of the furnace in order to load the furnace, thus limiting the heat losses from inside the furnace.

Furthermore, the invention makes it possible to load the furnace with scrap which has been heated in the same moving basket used to unload the scrap into the furnace. Moreover, the invention makes it possible to simplify and automate all the movements needed for loading, to reduce the times of the cycle, and minimises the spaces required and the equipment employed.

STATE OF THE ART

The state of the art includes electric arc furnaces used to produce steel from scrap and regenerated material of various types.

In the state of the art, the furnaces can be loaded continuously, for example by means of conveying means such as a belt, connected with the inside of the furnace and fed continuously with fresh scrap which gradually replaces that already loaded into the furnace.

In another solution, the furnaces are loaded discontinuously by means of baskets or containers. The baskets, in one or more successive steps, are loaded in a scrap-loading zone and then transported, by lifting and moving means, in correspondence with the mouth of the furnace which is kept open.

The bottom of the basket is then opened and the material is unloaded inside the furnace. For this purpose the baskets are equipped at the bottom with movable doors, valves, teeth, sliding grates or other appropriate opening system.

Systems using baskets for loading the furnace which are known to the state of the art have a plurality of disadvantages.

Firstly, it takes a long time to open the furnace which causes a considerable heat loss from inside the furnace towards the outside, and also the leakage into the surrounding environment of fumes containing powders, incandescent particles and other pollutants.

A further disadvantage is that if the scrap is loaded cold into the furnace, it takes longer to melt and causes problems for the penetration of the electrodes.

At present, in some steel plants the furnaces are loaded with scrap which is pre-heated by the heat of the fumes discharged from the furnace itself through the fourth hole on the roof.

WO 92/10594 discloses a method and a facility for producing steel by melting scraps, wherein the scrap is preheated in a basket by the fumes coming out from an electric arc furnace having a lowed shell ad a roof. The fumes leave the furnace through the roof and are conducted by ducts to a combustion chamber before being introduced in the basket through the removable roof thereof. The basket is placed in a removable manner on a moving mechanism for being translated or rotated from a first preheating position to a second unloading position. The roof of the furnace con be rotated by a second moving mechanism from a closed position to an open position.

The facility described in this document has the disadvantage that the roof of the furnace must be completely open before the basket containing the scrap is moved in its unloading position. This causes that the furnace remains open for a long period of time, so causing a big quantity of fumes to leave the furnace and diffuse into the surrounding environment, with a considerable pollution and heat loss.

Loading systems known to the state of the art where the scrap is pre-heated use loading baskets located in the appropriate rooms into which the fumes are conveyed before they are purified and discharged by the appropriate plants.

There are also solutions known to the state of the art which include a single room which contains several loading baskets, or several rooms connected to each other, each one of which contains a single loading basket.

These systems cause problems in the structuring of the rooms, the movements of the baskets.

Moreover, in the case of baskets heated inside the room, the scrap loses part of the heat it has accumulated, both when it is removed from the room and when it is transported to near the mouth of the furnace and also when it is unloaded into the furnace, from which there is always and in any case a considerable heat loss. The scrap moreover is not heated uniformly from one basket to the next.

These systems furthermore are not very functional, they are very expensive, and they take up a great deal of space inside the plant.

Another disadvantage of this type of loading system is that it is necessary to limit the use of the lifting cranes for the basket to the scrap-loading step, that is to say, to the melting cycles of the furnace; it is not therefore possible to use the cranes for other purposes required by the steel plant.

A further disadvantage is that the pre-heating rooms are normally located in positions which are not very near the furnace, and therefore the times needed to transport the baskets from this position to the furnace are very long and the heat losses are very high.

There are also systems known to the state of the art which load the furnace with stable containers, which can be moved only from a heating position to one wherein they load the furnace, in which case the containers are loaded either with conveyor belts or with baskets.

EP-A-0.225.939 teaches to heat the scrap with the fumes leaving the furnace and then unload the scrap into the furnace. The scrap is heated from above to below in a stationary, vertical container and the fumes also lap the lower opening means of the container.

According to this document it is necessary to displace the furnace, with all the problems of moving and positioning which that entails.

If on the one hand this teaching has the advantage that the scrap is heated in a differentiated manner from top to bottom, on the other hand it is complex, cumbersome, considerably difficult to manipulate, position and center, and has considerable problems of maintenance and management; moreover, the system involves transferring the scrap from the baskets to the vertical stationary container, which causes problems of vertical space.

Moreover, this system does not allow the baskets to be used directly in order to pre-heat the scrap, since they are used exclusively to transport and unload the scrap into the vertical stationary container.

This leads to an increase in the number of parts of the plant and therefore greater management and maintenance costs.

Pre-heating the scrap from the top down has the advantage that it allows the aforesaid vertical stationary container to be emptied easily since it reduces the risks of sticking or jamming, due to the fact that the scrap does not reach excessively high temperatures at the level of the valve grates.

Moreover, a high temperature at the top part of the scrap facilitates the penetration of the electrodes during the first melting step inside the furnace.

U.S. Pat. No. 4,506,370 teaches to enclose the furnace inside a closed box-like structure equipped with two doors, one used to unload into the ladle the molten metal contained inside the furnace, and the other to allow the entrance and exit of a container for pre-heating the scrap which is movable on rails.

One disadvantage of this embodiment is that the movable pre-heating container is part of a single structure with the moving trolley; this means that, in order to load the container outside the box-like structure, suitable loading baskets are used which are moved by bridge cranes or conveyor belts, but the same basket arriving from the scrap storage zone cannot be used for loading the furnace too.

This creates problems concerned with moving, replacing and exchanging the baskets.

Another disadvantage is that fumes are released inside the box-like structure which escape from the furnace when the container is in its loading position outside the box-like structure.

As a result, every time the aforesaid doors are opened, large amounts of fumes, powders, incandescent particles and other material may possibly escape from the box-like structure, and consequently cause problems of pollution to the environment wherein the furnace is installed.

Moreover, the box-like structure fills up with hot fumes and makes it difficult for the workers to gain access.

In this embodiment, as in EP-A-0 225 939, there is the advantage that the scrap is heated from the top downwards, even if, in this case, the scrap located in the lower part of the container are not directly lapped by the fumes.

In fact, the fumes escape from the container at the sides, and not at the bottom; therefore the scrap located on the bottom of the basket is heated very little, and in any case not in a uniform manner compared with the scrap higher up the container.

Moreover, the inclusion of a lateral hole for the outlet of fumes causes an intake which is not uniform and which can cause zones of different temperatures inside the basket, and consequently the scrap is not pre-heated in a homogeneous manner.

Moreover, using a box-like structure equipped with inlet/outlet doors and suitable to close the furnace, the loading container and the fume-conductor conduits, causes extremely high costs and bulk.

WO 96/32616 teaches to heat the scrap in a vertical movable container which is solid with a moving structure, the scrap being heated from the bottom to the top.

This document does not give the aforesaid advantages of heating the scrap from the top to the bottom; nor is it possible, with this invention, to use the baskets directly as the scrap must be transferred to the container with the consequent problems of vertical space. There is no possibility of acting directly with autonomous baskets, nor is it easy to carry out maintenance operations.

Pre-heating the scrap from the bottom can create problems of over-heating in the opening means situated on the bottom of the containers, and also the risk of sticking and jamming in the bottom part of the scrap which, because of the high temperatures, takes on an almost plastic state.

This system too, moreover, has the disadvantage that it is necessary to load the containers from above by means of bridge cranes, and this system takes up a considerable amount of vertical space which may not be compatible with the characteristics of the plant where the furnace is to be installed.

Moreover, the loading system incorporating containers involves great operating difficulties, safety problems, movement problems, increases in the cycle times and a whole series of other operating disadvantages.

A further disadvantage is that there are long downtimes needed to load the stationary pre-heating structure; these downtimes prevent a greater energy saving which can be obtained by exploiting the passage of the hot fumes through the scrap for as long as possible.

In this system, moreover, there is no system to by-pass the conduits which connect the discharge hole, or fourth hole, of the furnace to the vertical container, which would make it possible, at least while the vertical container is being loaded, to convey the fumes emerging from the furnace directly to the plants which purify the fumes and discharge them into the atmosphere.

Consequently, every time the vertical container is loaded, fumes, powders, incandescent particles necessarily escape into the environment where the furnace is installed, with the resulting problems of pollution.

The present applicants have therefore designed, tested and embodied this invention to overcome the shortcomings of the state of the art and to obtain further advantages.

DISCLOSURE OF THE INVENTION

The purpose of the invention is to obtain a method to load pre-heated scrap for electric arc furnaces, and also the relative system, which will give a plurality of operating and management advantages in the melting cycle of an electric arc furnace.

A first advantage of the invention is that it reduces the times and spaces required, both in height and on the horizontal plane, for the loading of the furnace by means of the baskets.

A second advantage is that it loads efficiently pre-heated scrap into the furnace, thus reducing the time needed to melt it, achieving high energy savings and reducing the problems relating to the penetration of the electrodes, particularly during the initial steps of the melting cycle.

Another advantage is that it reduces to a minimum the time for which the furnace remains open, and thus reduces the loss of heat from the furnace to the outside environment and also emissions of gas through the open roof.

Yet another advantage with this invention is that, as it does not use stationary containers placed above the baskets, but always the same, removable and exchangeable baskets, both for loading scrap in the scrap store, for loading scrap directly in the pre-heating station and also for unloading into the furnace, it is not necessary to raise the runways of the bridge cranes to excessive levels.

This means that a much smaller vertical space is occupied, the movements and equipment are simplified and the costs of installation and civil engineering are reduced.

Moreover, it is easier to carry out maintenance and replacement operations on the baskets.

A further advantage is that there is a reduction in the equipment required to move the baskets and the roof of the furnace, which makes it possible to use the cranes or auxiliary devices when they are free from other duties inside the plant.

The use of the cranes or other devices is not restricted by the melting cycle of the furnace.

Still another advantage of the invention is that the scrap is heated from the top down, and this facilitates the beginning of the melting process and the penetration of the electrodes.

Another advantage of the invention is that as the fumes come out from the bottom of the basket, they heat all the scrap contained therein uniformly, and are moreover taken in a uniform and homogeneous manner.

It is another advantage of the invention that a reduced number of baskets can be used.

Another advantage is that there is an increase in the preheating time of the scrap, with a consequently greater re-use of energy.

Furthermore, the invention makes it possible to reduce the problems of pollution in the environment where the furnace is installed by reducing the dispersion of fumes, powders and incandescent particles during the loading operations.

The invention moreover ensures that the entire process is extremely flexible, very reliable, and that it is possible to by-pass the baskets and therefore the pre-heating cycle should there be any particular requirements for loading the scrap or for the process.

The invention uses containing baskets which are equipped at the lower part with movable means which can be opened momentarily to unload the scrap from the bottom.

According to the invention, one basket at a time, already loaded with scrap inasmuch as it arrives loaded from the scrap store or loaded directly when it is already at the pre-heating station, is placed in a removable manner cooperation with movable moving means placed in proximity to the furnace and cooperating with the plane on which the mouth of the furnace lies.

The movable moving means allow the loaded basket to take up a first position, arranged at the side of and in close proximity to the furnace, where the scrap is pre-heated; a second position, cooperating with the mouth of the furnace, where the scrap is unloaded; and a third position, advantageously coinciding with the pre-heating position, where the basket is replaced.

With the system according to the invention therefore, the same basket loaded with the scrap is used directly to pre-heat the scrap; this makes it possible to reduce the amount of equipment of the plant and thus reduce costs.

According to a variant of the invention, the movable moving means comprise a first element associated with the basket and a second element associated with the roof of the furnace, the two elements being able to be at least temporally connected mechanically, electrically or magnetically.

This solution makes it possible to associate the movements of the basket towards/away from the furnace in a functional manner, and the movements of opening/closing of the mouth of the furnace according to the steps of the scrap-loading cycle.

The two elements of the movable moving means can be independent of each other so it is possible to carry out maintenance, replacement of parts, special jobs or for traditional processes of loading scrap.

Each basket, at least in its pre-heating position, cooperates temporally with a movable covering system which has a first closed position cooperating with the mouth of the basket and a second open position wherein it is released from the mouth of the basket.

The second open position is taken up by the covering system at least during the operations to replace or load the basket.

According to a variant, the side walls and the bottom of the basket cooperate with cooling systems associated with the basket.

According to the invention, the basket cooperates at least in its first pre-heating position with means to convey the fumes from the fourth hole of the furnace to the inside of the basket. The fumes are conveyed inside the basket so as to lap the scrap contained therein from the top downwards.

The fumes thus lap first the scrap at the top of the basket and then gradually spread to lap the scrap beneath. In this way, the scrap which is then unloaded forms a pile in the furnace where the temperature at the top is the highest.

This facilitates the penetration of the electrodes into the scrap, and also the formation and spread of the electric arc; this causes a reduction in the melting times and also of the electrical disturbances on the supply line.

In one embodiment of the invention, the inlet aperture for C the fumes into the basket is made in the movable covering system.

According to a variant, the inlet aperture for the fumes is made in the side wall of the basket, advantageously in the upper part.

In a first embodiment of the invention, the outlet aperture for the fumes from the basket, through which the fumes, after passing through the basket, are sent to the treatment systems and the chimney, is obtained by means of at least an annular duct made on the perimeter in the lower part of the basket, substantially in cooperation with the bottom. The annular duct is connected with the inside of the basket by means of a plurality of holes, or slits, in the side wall of the basket.

According to a variant, the basket does not have any specific apertures for the outlet of the fumes; the fumes, after lapping the scrap from the top downwards, are taken in from the inside of the basket by means of a discharge duct arranged below the basket which can be associated temporally with the bottom of the basket when the basket is in its first pre-heating position.

According to a variant, the discharge duct is cooled or made of refractory material.

This variant guarantees that all the scrap contained in the basket is heated in a homogeneous manner, and that the fumes are taken in and discharged in a homogeneous manner likewise.

According to a variant, the ducts to introduce the fumes into the basket and discharge them from the basket consist of one or more movable, flexible or telescopic elements, which can extend, contract and position themselves when the basket is positioned and translated towards and away from the furnace.

The ducts to introduce/discharge the fumes towards and away from the basket also include interception means which can be activated momentarily so as to interrupt the flow, for example during the movement, replacement or loading of the basket, and divert the fumes towards the processing systems and the chimney.

The unloading cycle of the scrap into the furnace includes the movement of the full basket containing the pre-heated scrap by means of the movable moving means and the coordinated translation of the roof of the furnace so as to open the mouth of the furnace.

The full basket immediately covers the mouth of the furnace, preventing both heat losses from inside the furnace and also environmental pollution caused by the leakage of fumes, powders, incandescent particles and other.

Then, the means on the bottom of the basket are opened to unload the scrap; subsequently, with an inverse translation movement of the movable moving means, the empty basket is taken back to its original position and the roof of the furnace is taken back to close the furnace.

In this position, the empty basket can be replaced, by means of a crane, by a new, full basket arriving from the scrap-loading zone.

The baskets, then, can be loaded directly in the scrap store and subsequently transported and positioned near the furnace in a desired stand-by zone.

The operations to replace the baskets are therefore extremely quick but, above all, loading the baskets does not constitute a constraint for the working cycles of the furnace.

According to a variant, when the empty basket is in its first position, it is loaded with new scrap, for example by means of a scrap-carrier which has its outlet end cooperating with the mouth of the basket.

According to a variant, the scrap-carrier has at the end means to distribute the unloaded scrap, of the magnetic or mechanical type.

When the basket has been replaced or loaded, the movable covering system is repositioned and the fumes are again conveyed inside the basket to pre-heat the scrap until the next loading step of the furnace.

According to the invention, all the operations to move the basket, such as loading, replacement, unloading of the scrap into the furnace etc., are automatically managed by a data processing unit.

ILLUSTRATION OF THE DRAWINGS

The attached figures are given as a non-restrictive example and show some preferential embodiments of the invention as follows.

DESCRIPTION OF THE DRAWINGS

The electric arc furnace 10, shown diagrammatically in the figures, is fed by direct current and has a single electrode 11; the following description, however, is also valid for electric furnaces operating in alternating current.

The furnace 10 comprises a shell 12, closed at the top by a roof 13 which has a central hole 14 to house the electrode 11 and a hole 15 arranged at the side, or fourth hole, to discharge the fumes 16.

The roof 13 is associated with its own movable moving means 17, in this case of the type including a trolley equipped with wheels 18, which can be moved on a runway 19.

The roof 13 can have at least two positions along the runway 19, respectively a first position 13a to close the furnace 10 and a second open position 13b.

In this case, the runway 19 consists of guides 34 arranged substantially in cooperation with the plane on which the mouth of the furnace 10 lies.

On the runway 19 there are also second movable moving means 24 with which the basket 21 containing the scrap 22 to be unloaded into the furnace 10 is momentarily associated, and in a removable manner.

When the second movable moving means 24 are activated, the loaded basket 21 is able to take up at least two positions: a first position 21a in proximity of the furnace 10 in order to pre-heat the scrap, and a second position 21b arranged above the mouth of the furnace 10 in order to unload the scrap.

In the first, pre-heating position 21a, the basket 21 cooperates at the top with an air-tight covering system 29 which can be temporally associated with the mouth of the basket 21.

In the first position 21a, the scrap 22 is pre-heated before being unloaded into the furnace; when the entire unloading cycle has been completed, after moving the covering system 29 into a position 29a of non-contact, with a rotational movement around a vertical axis and also, possibly, with a vertical movement, from position 21a the empty basket 21 is replaced by a new, full basket 121 arriving from the scrap-loading zone, or the same basket remains in the pre-heating position and is loaded with new scrap.

In this case, the first 17 and second 24 movable moving means can be associated with each other by means of connection means 23 which constrain them momentarily in their translation movements along the runway 19 and coordinate the movements of the basket 21 towards and away from the furnace 10 and the displacement of the roof 13 to/from its open/closed position.

In this case, the connection means 23 are of the mechanical type.

Since these movements are coordinated, the translation of the first movable moving means 17, as they take the roof 13 from its first closed position 13a to its second open position 13b, causes the coordinated translation of the second movable moving means 24 to take the basket 21 from its first pre-heating position 21a to its second position 21b wherein the scrap is unloaded into the furnace.

Once the scrap has been unloaded, to replace the roof 13 in its closed position 13b it is necessary to reposition the empty basket in position 21a so as to replace it with a full basket 121.

According to a variant, in this position 21a the empty basket is loaded with new scrap.

The close proximity of the first pre-heating position 21a of the basket 21 to the furnace 10 means that the opening times of the mouth of the furnace 10 are kept to a minimum since, when the roof 13 is taken to the open position 13b, the basket 21 immediately occupies the position previously occupied by the roof 13 and thus it is the basket 21 which closes the mouth of the furnace 10.

The loss of heat from inside the furnace 10 during the unloading of the scrap, and also the environmental pollution caused by the leakage of fumes and powders, are thus reduced to a minimum.

In the case shown in FIGS. 1a–1c and 2, each basket 21 has a first aperture 27 for the fumes to enter so as to convey the fumes leaving the furnace 10 inside the basket 21 from the top towards the bottom of the basket 21.

In the solutions shown here, the aperture 27 through which the fumes enter is placed in correspondence with the covering system 29.

According to a variant which is not shown here, the aperture 27 is placed in correspondence with the side wall of the basket 21 in its upper part.

In this case, the inlet aperture 27 for the fumes is connected with the fourth hole 15 of the furnace 10 by means of a first cooled pipe 30a equipped with its own interception means 33a.

The outlet aperture for the fumes is located in correspondence with the bottom of the basket 21, and is connected to a cooled or refractory pipe 30c, equipped with interception means 33c, by means of which the pre-heating fumes 16 are conveyed to a combustion chamber 28 and from here to the treatment systems 32 and the chimney by means of a pipe 31.

The combustion chamber is equipped, at least at its upper part, with burners 41.

The combustion chamber 28 may be directly connected with the fourth hole 15 of the furnace, during those steps when the scrap is not pre-heated, by means of a cooled or refractory duct 30b equipped with interception means 33b.

The duct 30b is connected with the fourth hole 15 by means of rapid attachment/detachment means 35.

Figure 3:
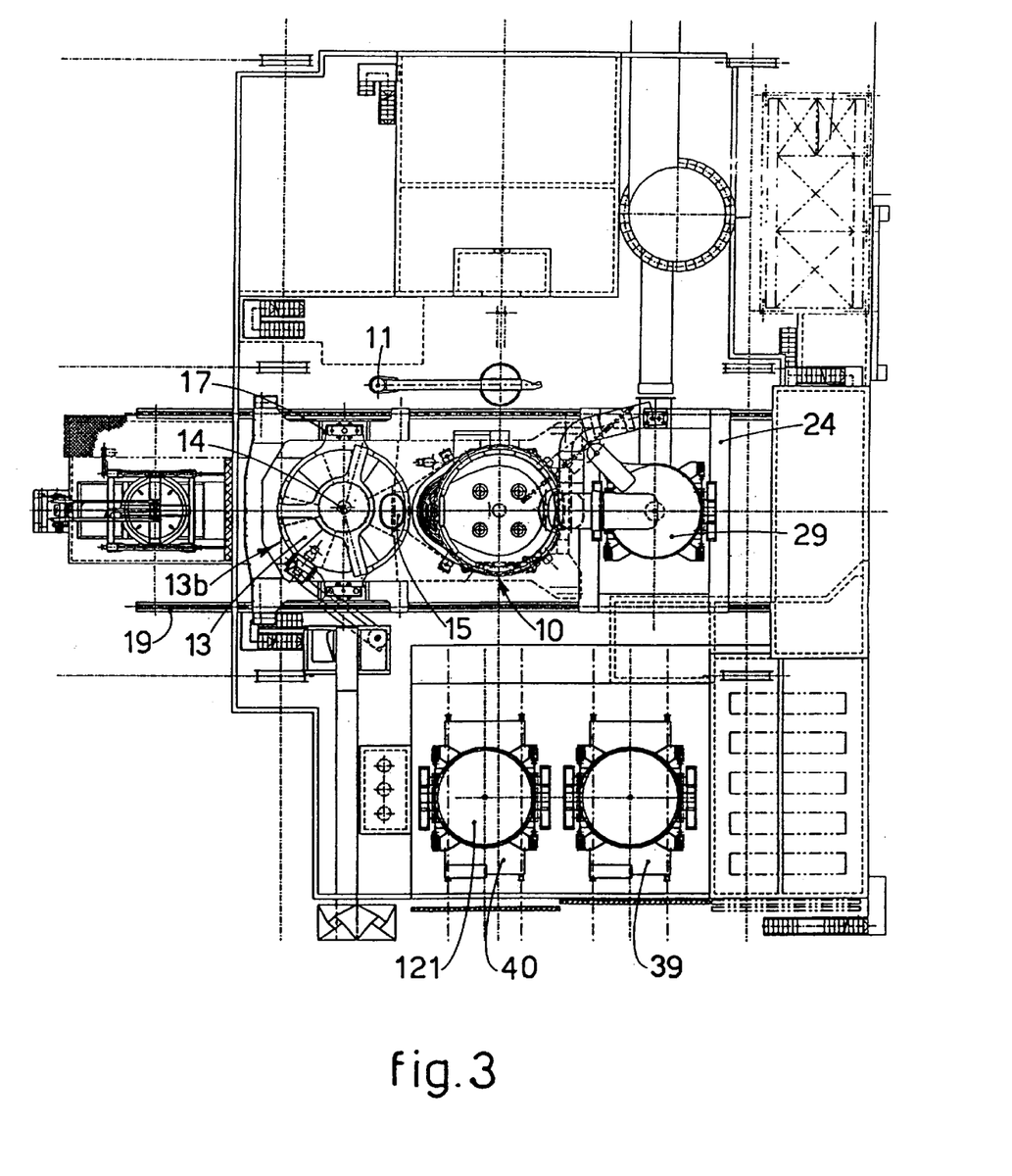
FIG. 3 shows a view from above of the electric furnace system adopting the method according to the invention.
Figure 4:
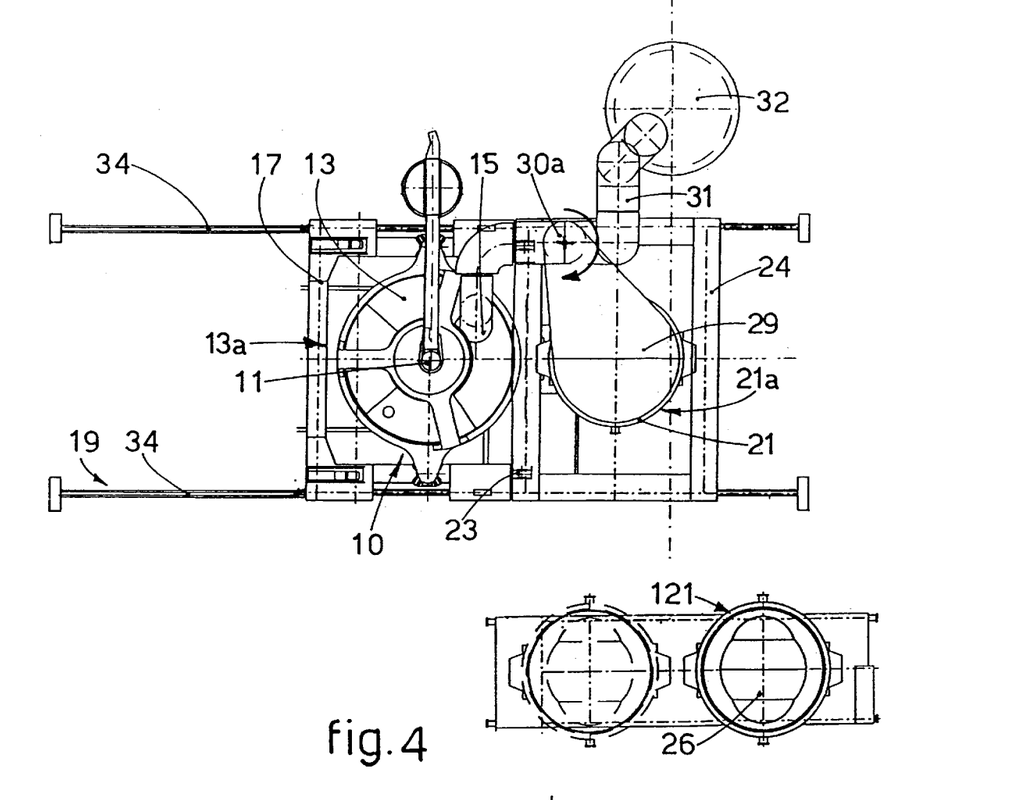
FIG. 4 shows a part view of FIG. 3 during the operating step when the basket is in position to pre-heat the scrap.
Figure 5:
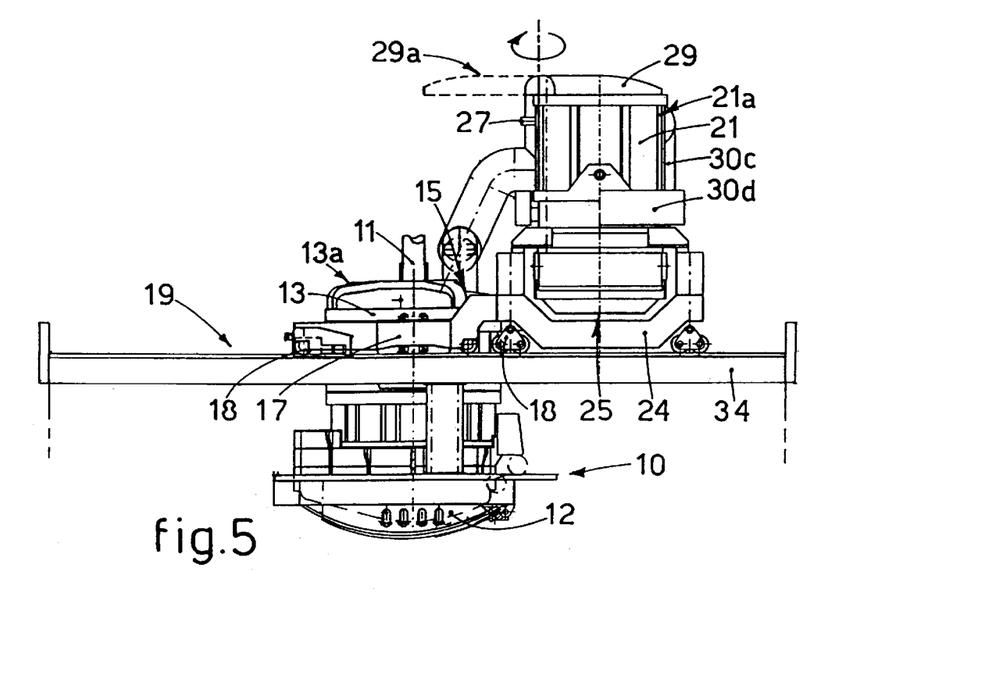
FIG. 5 shows a side view of FIG. 4.

With the basket 21 in the pre-heating position 21a (FIGS. 1a and 3),-the interception means 33a are open and the fumes 16 leaving the furnace 10 are conveyed inside the basket 21 from the top through the inlet aperture 27 for the fumes which is located on the covering system 29.

The fumes 16 lap the scrap 22 from the top towards the bottom, causing a maximum pre-heating temperature in correspondence with the top of the scrap 22; this temperature gradually decreases towards the lower part of the basket 21.

In this way, when the scrap 22 is unloaded into the furnace 10, the pile which is formed is hotter and facilitates the penetration of the electrode 11 and the generation of the electric arc; consequently, the start of the melting process is facilitated and disturbances on the feeding line are reduced.

The fumes 16 leave the basket 21 through the bottom and, according to a variant, this can be achieved by means of a fume-intake ring 30d which induces the flow of fumes 16 to assume a substantially cyclonic development inside the basket 21 before the fumes are discharged towards the combustion chamber 28.

This makes the intake of fumes uniform and prevents the formation of zones with different temperatures inside the basket.

Figure 6:
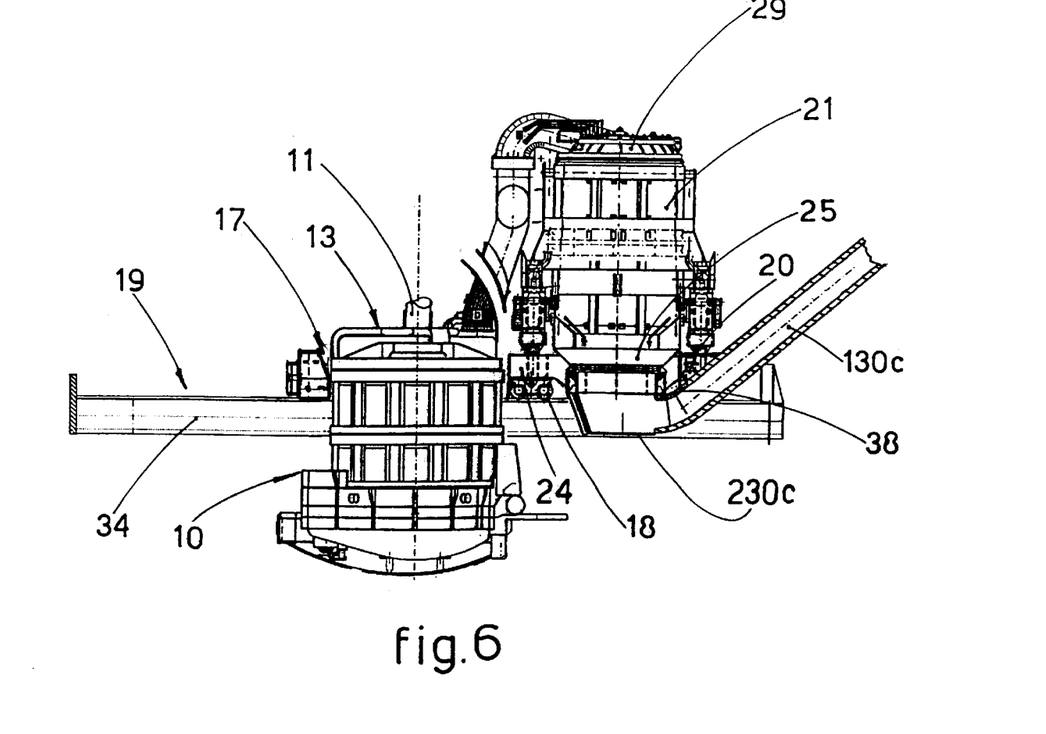
FIG. 6 shows a variant of FIG. 5.

According to the variant shown in FIG. 6, after the fumes have passed through the basket 21 they are discharged through a discharge duct 130c, cooled or made of refractory material, of the basket 21 and able to be associated at least momentarily with the bottom 25 thereof.

According to this variant, the discharge duct 130c cooperates with a connection ring 38 associated with moving means 20 to temporally ensure, when the basket 21 is in the pre-heating position 21a, the air-tight connection between the bottom 25 of the basket 21 and the discharge duct 130c.

In this case, the part of the duct 130c associated with the bottom 25 of the basket 21 is equipped with its own cooling system which enables the temperature of the fumes to be further lowered before they reach the purification plants and are expelled into the atmosphere.

The part of the duct 130c associated with the bottom 25 of the basket 21 is moreover equipped at the lower part with an inspection door 230c which enables any precipitates of particles or slag contained in the fumes to be discharged.

This embodiment allows the fumes passing in the basket to lap the scrap located lower down too; this gives a more homogeneous distribution of temperatures in the scrap and therefore a greater yield on the part of the furnace.

Figure 1A:
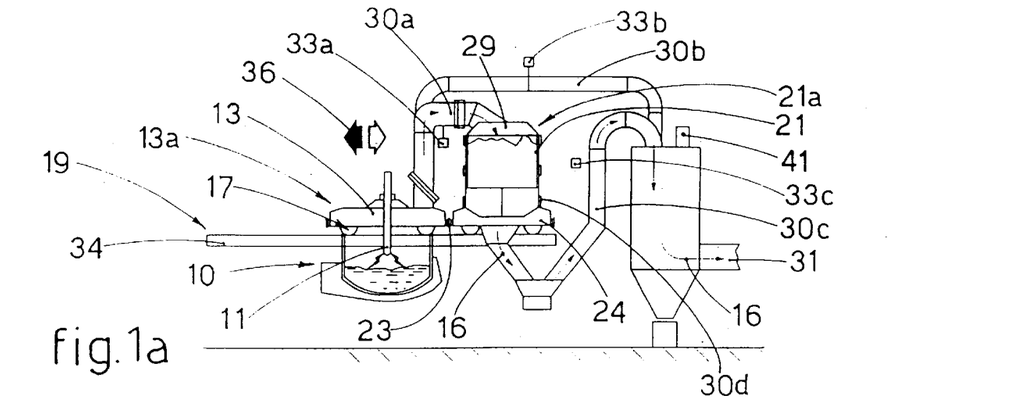
FIGS. 1a, 1b and 1c show in diagram form three operating steps of the method according to the invention in a first embodiment.
Figure 1B:
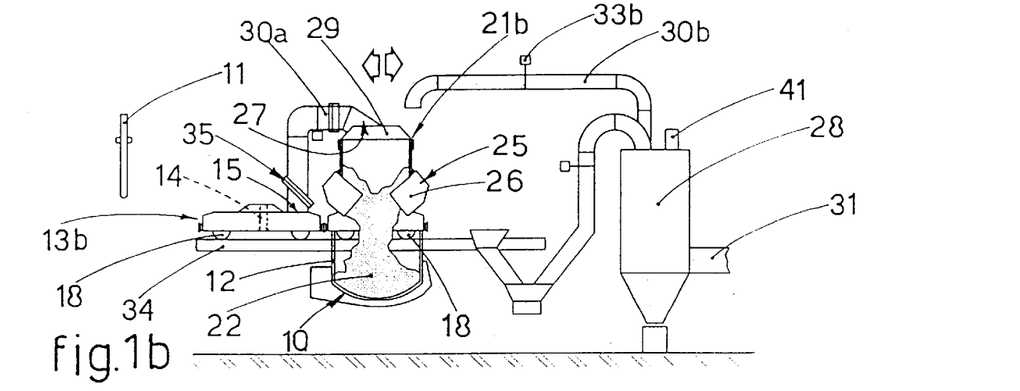
Figure 7:
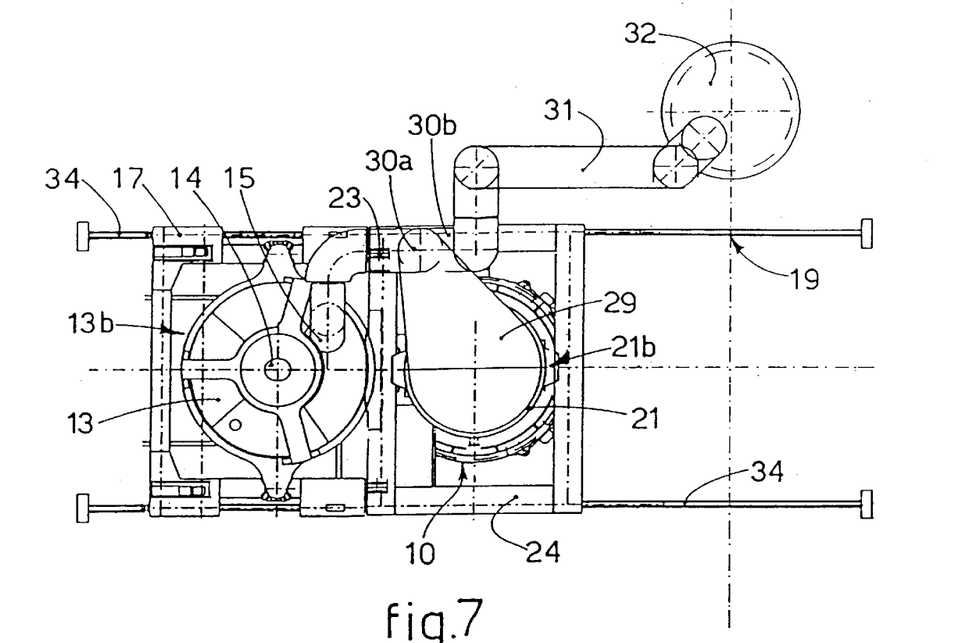
FIG. 7 shows a part view of FIG. 3 during the operating step when the basket is in position to unload the scrap.
Figure 8:
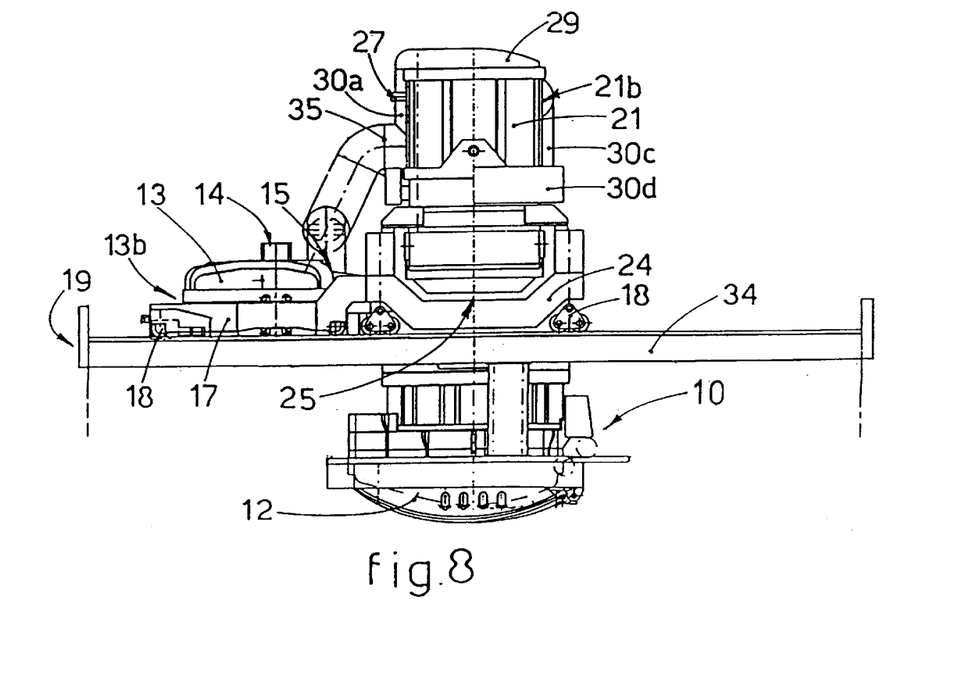
FIG. 8 shows a side view of FIG. 7.

When the scrap 22 is unloaded into the furnace, the roof 13 and basket 21 together, with their respective moving means 17 and 24 constrained by the connection means 23, translates in the direction 36 so as to take the basket 21 above the mouth of the furnace 10 (FIGS. 1b, 7 and 8).

At least the discharge duct 31 is of the flexible or telescopic type and extends (FIG. 7) to assist the translation movement of the basket 21-roof 13.

Figure 1C:
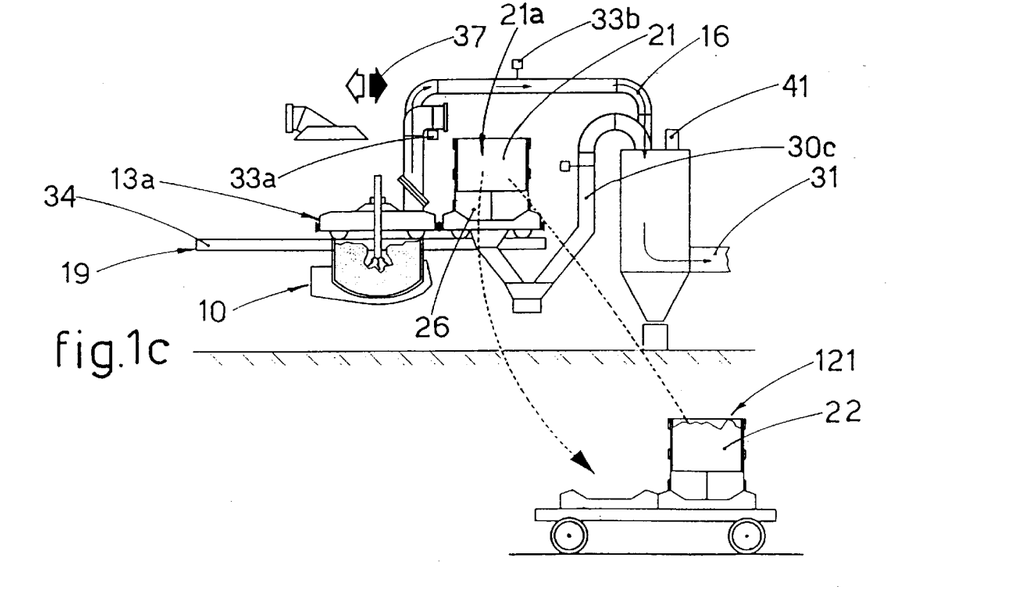
Figure 9:
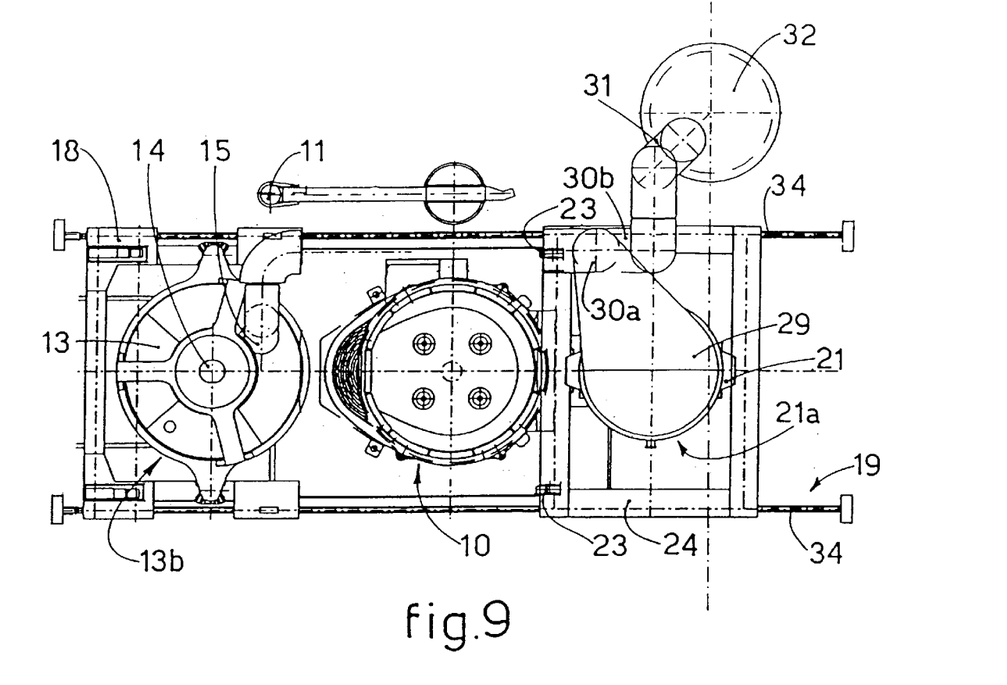
FIG. 9 shows a part view of FIG. 3 during the operating step when the basket has returned to the pre-heating position and the roof of the furnace is still laterally displaced with respect to the furnace.
Figure 10:
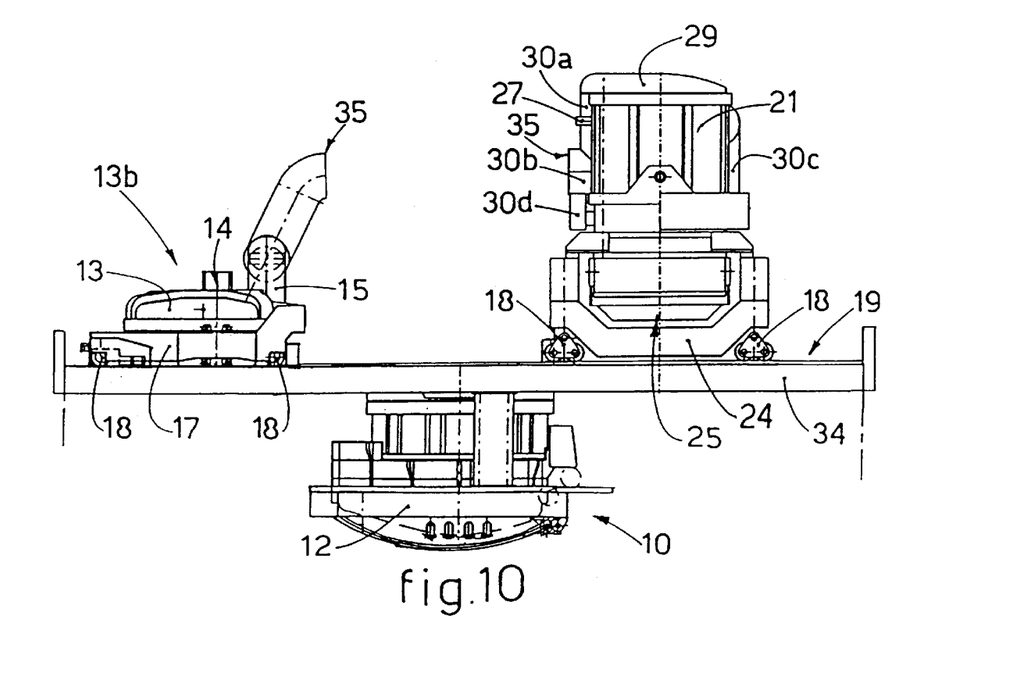
FIG. 10 shows a side view of FIG. 9.

When unloading is completed, by means of opening the movable valves 26 which constitute the bottom of the basket 21, an inverse translation is performed in direction 37 to bring the roof 13 back to the closed position 13a and the empty basket 21 to the replacement position 21a (FIGS. 1c, 9 and 10).

During this step, the interception means 33a and the interception means 33c are closed and the interception means 33b are open, so as to convey the fumes 16 from the fourth hole 15 directly to the combustion chamber 28, the discharge duct 31 and to the processing system 32 through the duct 30b.

During the melting cycle inside the furnace 10 the empty basket 21 is removed by the moving means 24.

The empty basket 21 is arranged on a first handling trolley 39 and is replaced by a full basket 121, arranged on a second handling trolley 40 arriving from the filling zone.

When the full basket 121 has replaced the empty basket 21, the covering system 29 is again taken to the closed position, thus allowing the pre-heating cycle to be re-started.

According to a variant which is not shown here, the empty basket 21, in position 21a, is loaded with scrap by means of a scrap-carrier belt which has the terminal end arranged in cooperation with the mouth of the basket 21 in position 21a.

The basket 21 is then filled with scrap without needing to be displaced by the moving means 24.

According to another variant, the carrier belt has a rotary distributor element which regulates and makes uniform the distribution of the scrap inside the basket 21.

Figure 2:
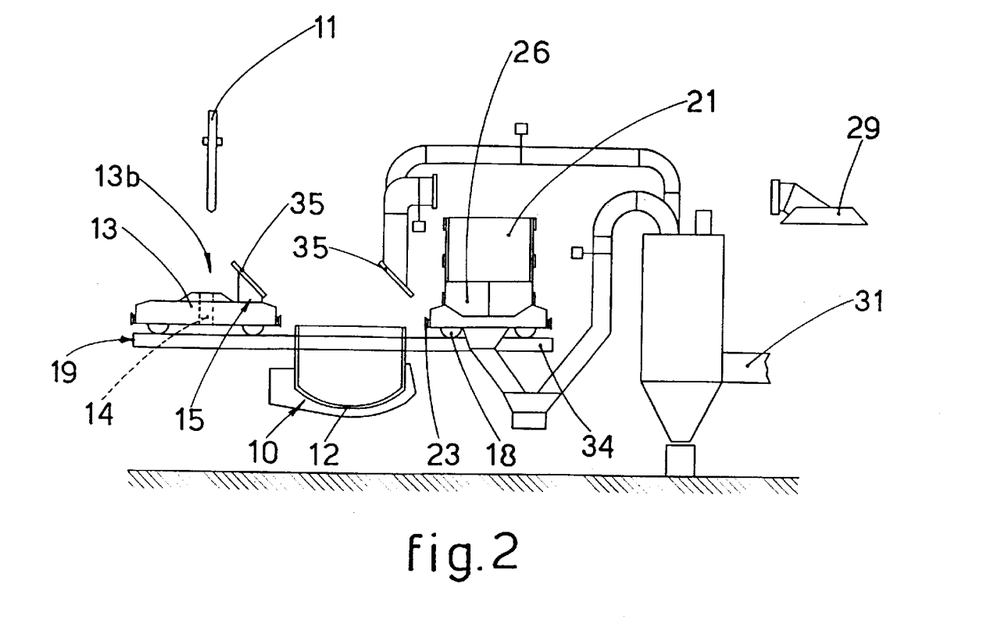
FIG. 2 shows a subsequent operating step of the invention according to the embodiment of FIGS. 1a, 1b, 1c.

In this case, by releasing the connection means 23 and the attachment/detachment means 35 between the fourth hole 15 and the duct 30b, the moving means 17 and 24 are made independent of each other (FIG. 2).

This allows the roof 13 and the basket 21 to be positioned in respective positions 13b and 21a, for example for maintenance work on the shell 12 or even, if necessary, to load the furnace 10 with conventional systems.

What is claimed is:

1. A method for loading scrap into an electric arc furnace having a lower shell and an upper roof movable between a first closed position and a second open position, wherein the roof has a hole for exhausting fumes produced in the furnace, wherein the scrap is contained in a basket equipped with lower discharging means to discharge the scrap from the bottom and with an upper covering system, wherein the basket is movable between a first pre-heating position adjacent to said furnace to pre-heat the scrap and a second position above said furnace to unload the scrap into the furnace, wherein first moving means are provided for selectively moving the roof of the furnace between said first closed position to said second open position and vice-versa, wherein said moving means are provided for moving the basket between said first preheating position to said second position and vice-versa, and wherein a connecting tube connects the hole of the roof with the basket, the method being characterized in that said first moving means and said second moving means are translated together along common linear guide means in such a manner that the linear translation of the roof of the furnace is correlated to the linear translation of the basket containing the scrap, whereby said basket gradually covers the lower shell of the furnace whilst the roof of the furnace gradually moves from its first closed position to its second open position, in that said upper covering system of said basket is movable between a closed position associated to the mouth of the basket and an open position for loading the scrap into the basket or for replacing an empty basket with a fill basket arriving from a scrap-loading zone, in that said connecting tube connects said hole to said upper covering system when the upper covering system is in its closed position, in that said connecting tube maintains said roof connected to said upper covering system of the basket during the movement of said first and second moving means, and in that the fumes leave the basket through an outlet aperture disposed in the bottom of the basket and directly connected with a combustion chamber.

2. Method as in claim 1, wherein the basket is removably mounted on said second moving means and is also movable from said first pre-heating position to a third replacement position wherein a new, full basket replaces the unloaded basket, and wherein said covering system is temporally released from the basket during the movement of said basket from its first pre-heating position to its third replacing position.

3. Method as in claim 2, in which at least during the replacement of an empty basket the fumes are intercepted and diverted directly to a fumes processing system through the combustion chamber.

4. Method as in claim 2, in which the basket, in its third replacement position, is released from the covering system, removed from the second moving means and deposited on a first handling trolley located alongside, a full basket on a second handling trolley located alongside the first handling trolley being positioned in a removable manner onto the second moving means to assume the first pre-heating position.

5. Method as in claim 2, in which in its third position the empty basket is loaded with scrap by means of a scrap carrier.

6. A system for loading scrap into an electric arc furnace having a lower shell and an upper roof movable between a first closed position and a second open position, wherein the roof has a hole for exhausting fumes produced in the furnace, wherein the scrap is contained in a basket equipped with lower discharging means to discharge the scrap from a bottom of the basket, wherein the basket is movable between a first pre-heating position adjacent to said furnace to pre-heat the scrap and a second position above said furnace to unload the scrap into the furnace, wherein the first moving means are provided for selectively moving the roof of the furnace from said first closed position to said second open position and vice-versa, wherein second moving means are provided for moving the basket from said first pre-heating position to said second position and vice-versa, and wherein a connecting tube connects the hole of the roof with the basket, characterized in that connecting means connects said first moving means to said second moving means, in that linear guide means are provided for guiding both said first moving means and said second moving means along a common rectilinear runway, in such a manner that the linear translation of the roof of the furnace is correlated to the linear translation of the basket containing the scrap, whereby said basket is able to gradually cover the lower shell of the furnace whilst the roof of the furnace gradually moves from its first closed position to its second open position, in that an upper covering system of said basket is associated to the mouth of the basket and is movable between a closed position and an open position for loading the scrap into the basket or for replacing an empty basket with a full basket arriving from a scrap-loading zone, in that said connecting tube connects said hole to said upper covering system when the upper covering system is in its closed position, in that said connecting tube is able to be maintained connected to said roof and to said supper covering system of the basket during the movement of said first and second moving means, and in that the basket comprises at least a bottom outlet aperture for the fumes connected to a combustion chamber communicating, by means of a discharge duct, with a treatment system to treat the flumes and with a chimney.

7. System as in claim 6, in which the connection means between the first and the second moving means are mechanical connection means.

8. System as in claim 6, in which the connection means between the first and second moving means are electric or magnetic means.

9. System as in claim 6, in which said upper covering system is rotatable and vertically movable.

10. System as in claim 6, which includes a first duct, equipped with first interception means, between the aperture for the inlet of the fumes into the basket and the hole for the outlet of the fumes from the furnace.

11. System as in claim 6, which includes a second duct, cooled or made of refractory material, equipped with second interception means, disposed between the bottom outlet aperture of the basket and the discharge duct.

12. System as in claim 6, which includes a third duct, cooled or made of refractory material, equipped with interception means, disposed between the discharge duct and the hole for exhausting fumes from the furnace.

13. System as in claim 6, in which at least the discharge duct is of the type which is extended or contracted.

* * * * *